US012302210B2

(12) United States Patent
Shen et al.

(10) Patent No.: US 12,302,210 B2
(45) Date of Patent: May 13, 2025

(54) TECHNIQUES FOR MANAGING SUBSCRIPTION IDENTIFICATION FOR EMERGENCY CALL

(71) Applicant: QUALCOMM Incorporated, San Diego, CA (US)

(72) Inventors: Xinning Shen, San Diego, CA (US); Flora Pui San Chan, San Diego, CA (US); Qin Xue Frantti, San Diego, CA (US); Osama Lotfallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/351,382

(22) Filed: Jul. 12, 2023

(65) Prior Publication Data
US 2023/0362614 A1 Nov. 9, 2023

Related U.S. Application Data

(62) Division of application No. 16/934,818, filed on Jul. 21, 2020, now Pat. No. 11,736,922.
(Continued)

(51) Int. Cl.
H04W 4/90 (2018.01)
H04W 4/021 (2018.01)
(Continued)

(52) U.S. Cl.
CPC ............ *H04W 4/90* (2018.02); *H04W 4/022* (2013.01); *H04W 4/16* (2013.01); *H04W 8/183* (2013.01); *H04W 48/18* (2013.01); *H04W 76/50* (2018.02)

(58) Field of Classification Search
USPC ...................................................... 455/404.1
See application file for complete search history.

(56) References Cited

U.S. PATENT DOCUMENTS 5,528,664 A 6/1996 Slekys et al.
2008/0009262 A1 1/2008 Rudolf et al.
(Continued)

FOREIGN PATENT DOCUMENTS

DE 102011054624 A1 4/2013
EP 1890516 A1 * 2/2008 ............ H04W 48/14

OTHER PUBLICATIONS

International Preliminary Report on Patentability—PCT/US2020/043270, the International Bureau of WIPO—Geneva, Switzerland, Feb. 10, 2022.
(Continued)

Primary Examiner — Jinsong Hu
Assistant Examiner — Alexander J Yi
(74) Attorney, Agent, or Firm — Dalei Dong; Norton Rose Fulbright US LLP

(57) ABSTRACT

A UE in cellular communication system may be equipped with multiple User Services Identity Modules (USIMs) to support multiple service subscriptions. The UE having multiple service subscriptions may obtain services from one or more wireless networks with each of the subscriptions. When the UE having multiple service subscriptions needs to make an emergency call, the UE may identify and determine a service subscription to make the emergency call, so that the emergency call can be successfully made. The UE may be implemented with a communication processor (modem) and an application processor (AP). Some information that is useful to identify a service subscription more suitable for the emergency call may be available only at the communication processor. Enhanced techniques for identifying and determining a service subscription to make the emergency call
(Continued)

from the multiple service subscriptions through interaction between the communication processor and the application processor are disclosed.

20 Claims, 8 Drawing Sheets

Related U.S. Application Data

(60) Provisional application No. 62/881,140, filed on Jul. 31, 2019.

(51) Int. Cl.
*H04W 4/16* (2009.01)
*H04W 8/18* (2009.01)
*H04W 48/18* (2009.01)
*H04W 76/50* (2018.01)

(56) References Cited

U.S. PATENT DOCUMENTS

| | | | |
|---|---|---|---|
| 2012/0142308 A1 | 6/2012 | Lee et al. | |
| 2015/0312717 A1* | 10/2015 | Shih | H04W 4/025 455/456.1 |
| 2016/0088450 A1* | 3/2016 | Bendi | H04W 4/14 455/404.1 |
| 2016/0345149 A1* | 11/2016 | Chuttani | H04W 48/18 |
| 2016/0345244 A1* | 11/2016 | Chuttani | H04W 48/16 |
| 2018/0192470 A1 | 7/2018 | Guven et al. | |
| 2021/0037367 A1 | 2/2021 | Shen et al. | |

OTHER PUBLICATIONS

International Search Report and Written Opinion—PCT/US2020/043270—ISAEPO—Sep. 14, 2020.

\* cited by examiner

TECHNIQUES FOR MANAGING SUBSCRIPTION IDENTIFICATION FOR EMERGENCY CALL

CROSS-REFERENCE TO RELATED APPLICATIONS

This application is a divisional application and claims the benefit of U.S. patent application Ser. No. 16/934,818, entitled, "TECHNIQUES FOR MANAGING SUBSCRIPTION IDENTIFICATION FOR EMERGENCY CALL," filed on Jul. 21, 2020, and also claims benefit of U.S. Provisional Patent Application No. 62/881,140, entitled, "TECHNIQUES FOR MANAGING SUBSCRIPTION IDENTIFICATION FOR EMERGENCY CALL," filed on Jul. 31, 2019, the disclosures of which are hereby incorporated by reference herein in their entirety as if fully set forth below and for all applicable purposes.

FIELD OF THE DISCLOSURE

Aspects of the present disclosure relate generally to wireless communication systems, and more particularly, to techniques for managing identification of one or more subscriptions for an emergency call when a user equipment (UE) has multiple wireless service subscriptions.

DESCRIPTION OF RELATED ART

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

The UE accesses the wireless network for various services, including making a phone call, sending a text message or a multimedia message, browsing websites, etc. One of the key services that the wireless network provides to the UE is emergency call services. When a user of the UE is in emergency, he or she can make an emergency call using his/her UE to initiate an emergency session. The wireless network may handle the emergency session with higher priority, so that the user in emergency can get proper help as soon as possible. A UE may support multiple subscriptions to the wireless networks at the same time.

SUMMARY

A UE may have multiple User Services Identity Modules (USIMs) to support multiple subscriptions. When the UE supports multiple subscriptions at the same time, the UE may obtain services (e.g., emergency service) from one or more wireless networks with each of the subscriptions. When the UE having multiple service subscriptions needs to make an emergency call, the UE may identify and determine a subscription to make the emergency call, so that the emergency call can be successfully made. Enhanced techniques for identifying and determining a service subscription to make the emergency call from the multiple service subscriptions are disclosed.

In one aspect of the disclosure, a method of wireless communication for a wireless communication device supporting multiple service subscriptions is disclosed. The method may include receiving, from an application layer of the wireless communication device, an emergency call subscription selection request The method may further include identifying, in response to the emergency call subscription selection request, a first service subscription from the multiple service subscriptions based on information associated with the multiple service subscriptions. The information may include a first portion that is available to a layer below the application layer and is unavailable at the application layer, and a second portion that is available at the application layer. The method may also include providing, to the application layer, a first indication of the first service subscription.

In an additional aspect of the disclosure, a method of wireless communication for a wireless communication device supporting multiple service subscriptions is disclosed. The method may include transmitting, from an application layer of the wireless communication device to a layer below the application layer, an emergency call subscription selection request. The method may further include receiving, in response to the emergency call subscription selection request, a first indication of a first service subscription from the layer below the application layer. The indication of the first service subscription may be based on information associated with the multiple service subscriptions, and the information may include a first portion that is available to the layer below the application layer and is unavailable at the application layer, and a second portion that is available at the application layer. The method may also include determining, at the application layer in response to receiving the first indication of the first service subscription, a service subscription of the multiple service subscriptions for an emergency call.

In an additional aspect of the disclosure, an apparatus supporting multiple service subscriptions configured for wireless communication is disclosed. The apparatus includes at least one processor, and a memory coupled to the processor. The processor may be configured to receive, from an application layer of the wireless communication device, an emergency call subscription selection request. The processor may further be configured to identify, in response to the emergency call subscription selection request, a first service subscription from the multiple service subscriptions based on information associated with the multiple service subscriptions. The information may include a first portion that is available to a layer below the application layer and is unavailable at the application layer, and a second portion that is available at the application layer. The processor may also be configured to provide, to the application layer, the first service subscription.

In an additional aspect of the disclosure, an apparatus supporting multiple service subscriptions configured for wireless communication is disclosed. The apparatus includes at least one processor, and a memory coupled to the processor. The processor may be configured to transmit, from an application layer of the wireless communication device to a layer below the application layer, an emergency call subscription selection request. The processor may further be configured to receive, in response to the emergency call subscription selection request, a first indication of a first service subscription from the layer below the application layer. The indication of the first service subscription may be based on information associated with the multiple service subscriptions, and the information may include a first portion that is available to the layer below the application layer and is unavailable at the application layer, and a second portion that is available at the application layer. The processor may also be configured to include determining, at the application layer in response to receiving the first indication of the first service subscription, a service subscription of the multiple service subscriptions for an emergency call.

In an additional aspect of the disclosure, an apparatus supporting multiple service subscriptions configured for wireless communication is disclosed. The apparatus may include means for receiving, from an application layer of the wireless communication device, an emergency call subscription selection request. The apparatus may further include means for identifying, in response to the emergency call subscription selection request, a first service subscription from the multiple service subscriptions based on information associated with the multiple service subscriptions. The information may include a first portion that is available to a layer below the application layer and is unavailable at the application layer, and a second portion that is available at the application layer. The apparatus may also include means for providing, to the application layer, a first indication of the first service subscription.

In an additional aspect of the disclosure, an apparatus supporting multiple service subscriptions configured for wireless communication is disclosed. The apparatus may include means for transmitting, from an application layer of the wireless communication device to a layer below the application layer, an emergency call subscription selection request. The apparatus may further include means for receiving, in response to the emergency call subscription selection request, a first indication of a first service subscription from the layer below the application layer. The indication of the first service subscription may be based on information associated with the multiple service subscriptions, and the information may include a first portion that is available to the layer below the application layer and is unavailable at the application layer, and a second portion that is available at the application layer. The apparatus may also include means for determining, at the application layer in response to receiving the first indication of the first service subscription, a service subscription of the multiple service subscriptions for an emergency call.

In an additional aspect of the disclosure, a non-transitory computer-readable medium has program code for a wireless communication device supporting multiple service subscriptions recorded thereon. The program code may include code to receive, from an application layer of the wireless communication device, an emergency call subscription selection request. The program code may further include code to identify, in response to the emergency call subscription selection request, a first service subscription from the multiple service subscriptions based on information associated with the multiple service subscriptions. The information may include a first portion that is available to a layer below the application layer and is unavailable at the application layer, and a second portion that is available at the application layer. The program code may also include code to provide, to the application layer, a first indication of the first service subscription.

In an additional aspect of the disclosure, a non-transitory computer-readable medium has program code for a wireless communication device supporting multiple service subscriptions recorded thereon. The program code may include code to transmit, from an application layer of the wireless communication device to a layer below the application layer, an emergency call subscription selection request. The program code may further include code to receive, in response to the emergency call subscription selection request, a first indication of a first service subscription from the layer below the application layer. The indication of the first service subscription may be based on information associated with the multiple service subscriptions, and the information may include a first portion that is available to the layer below the application layer and is unavailable at the application layer, and a second portion that is available at the application layer. The program code may also include code to determine, at the application layer in response to receiving the first indication of the first service subscription, a service subscription of the multiple service subscriptions for an emergency call.

In some examples of the method, apparatuses, and non-transitory computer-readable medium described herein, the first portion of the information may be available only at the layer below the application layer.

In some examples of the method, apparatuses, and non-transitory computer-readable medium described herein, the layer below the application layer may be a communication layer.

In some examples of the method, apparatuses, and non-transitory computer-readable medium described herein, the communication layer may include a modem of the wireless communication device.

In some examples of the method, apparatuses, and non-transitory computer-readable medium described herein, the application layer may include a voice calling application.

In some examples of the method, apparatuses, and non-transitory computer-readable medium described herein, the information may include emergency call support information for the multiple service subscriptions, service status information for the multiple service subscriptions, roaming information for the multiple service subscriptions, and radio condition information for the multiple service subscriptions.

In some examples of the method, apparatuses, and non-transitory computer-readable medium described herein, the first portion of the information may include part of service status information and part of radio condition information.

In some examples of the method, apparatuses, and non-transitory computer-readable medium described herein, the identifying the first service subscription may be based on emergency call support information of the information. The identifying may include selecting the first service subscription based on the first service subscription being a subscription of the multiple service subscriptions that supports emergency calls natively over a subscription of the multiple service subscriptions that supports emergency fallback or a subscription of the multiple service subscriptions without emergency call support.

In some examples of the method, apparatuses, and non-transitory computer-readable medium described herein, the identifying the first service subscription may be based on emergency call support information of the information. The identifying may include selecting the first service subscription based on the first service subscription being a subscription of the multiple service subscriptions that supports emergency calls over packet switch radio access technology over a subscription of the multiple service subscriptions that supports emergency calls over circuit switch radio access technology.

In some examples of the method, apparatuses, and non-transitory computer-readable medium described herein, the identifying the first service subscription may be based on service status information of the information. The identifying may include selecting the first service subscription, based on the first service subscription being a subscription of the multiple service subscriptions with a higher service status, wherein full service status is designated as higher than limited service status and the limited service status is designated as higher than no service status.

In some examples of the method, apparatuses, and non-transitory computer-readable medium described herein, the service status information may be a buffered service status information that is available to the layer below the application layer and is unavailable at the application layer.

In some examples of the method, apparatuses, and non-transitory computer-readable medium described herein, the identifying the first service subscription may be based on roaming information of the information. The identifying may include selecting the first service subscription, based on the first service subscription being a subscription of the multiple service subscriptions being served in a home network over a subscription of the multiple service subscriptions being served in a roaming network.

In some examples of the method, apparatuses, and non-transitory computer-readable medium described herein, the identifying the first service subscription may be based on radio condition information of the information. The identifying may include determining a probability for the emergency call to succeed for each service subscription of the multiple service subscriptions based on emergency access barring probability, rejection causes, signal strength, or a combination of thereof, and selecting the first service subscription based on the first service subscription being a subscription of the multiple service subscriptions with a higher probability for the emergency call to succeed.

In some examples of the method, apparatuses, and non-transitory computer-readable medium described herein, the identifying the first service subscription may be a hierarchical identification. The hierarchical identification may be based on predetermined identifying steps using different parts of the information. An identifying step based on a second part of the information may take place if an identifying step based on a first part of the information fails to select one subscription for the first service subscription.

In some examples of the method, apparatuses, and non-transitory computer-readable medium described herein, the identifying the first service subscription may be based on radio condition information of the information, if the identifying based on other part of the information fails to select one subscription of the multiple service subscriptions.

Some examples of the method, apparatuses, and non-transitory computer-readable medium described herein may further include identifying a second service subscription in addition to the first service subscription if the identifying the first service subscription based on the hierarchical identification fails to select one subscription of the multiple service subscriptions, and providing, to the application layer, a second indication of the second service subscription.

In some examples of the method, apparatuses, and non-transitory computer-readable medium described herein, the first indication of the first service subscription and the second indication of the second service subscription may be a single indication of equal priority.

Some examples of the method, apparatuses, and non-transitory computer-readable medium described herein may further include receiving, from the application layer, an emergency call request, wherein the emergency call request may designate a subscription of the multiple service subscriptions other than the first service subscription.

Some examples of the method, apparatuses, and non-transitory computer-readable medium described herein may further include receiving, in response to the emergency call subscription selection request, a second indication of a second service subscription from the layer below the application layer.

In some examples of the method, apparatuses, and non-transitory computer-readable medium described herein, the determined service subscription for the emergency call may be different from the first service subscription from the layer below the application layer.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
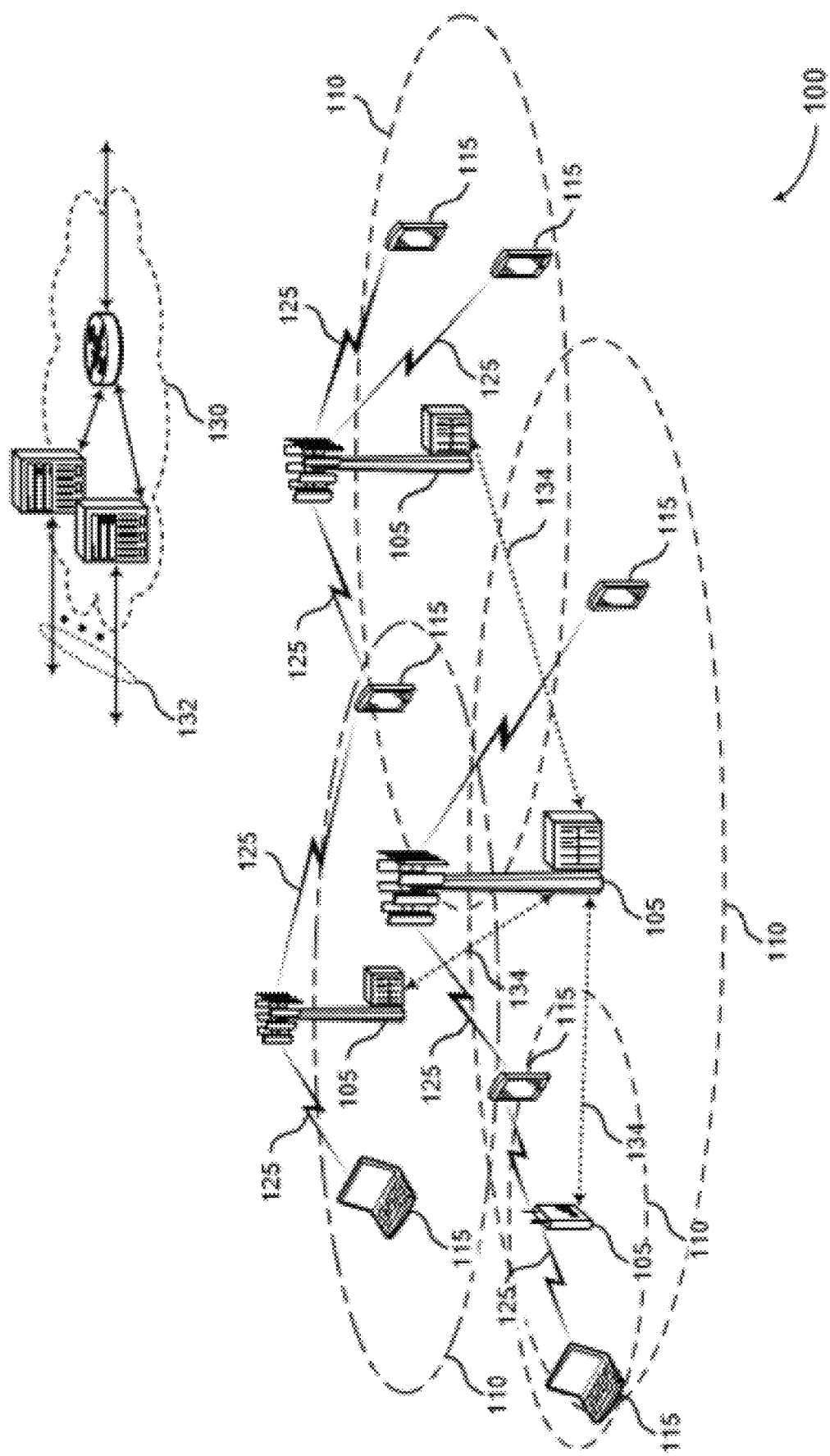
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100. The wireless communications system 100 includes base stations 105, UEs 115, and a core network 130. In some examples, the wireless communications system 100 may be a UMTS network, a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Figure 2:
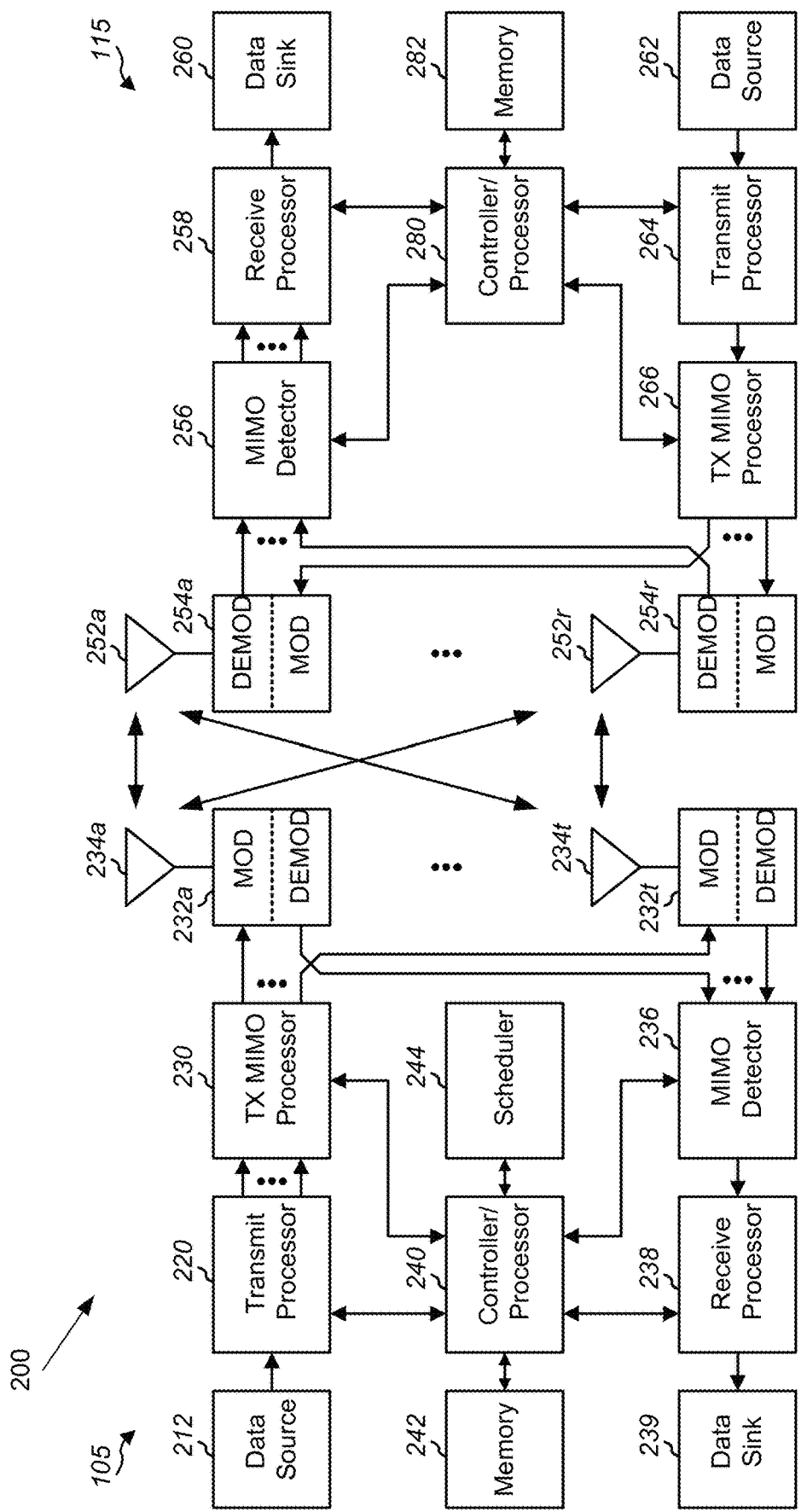
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, FIG. 6, FIG. 7 and FIG. 8 and/or other processes for the techniques described herein. The memories 242 and 282 may store data and program codes for the base station 105 and the UE 115, respectively. A scheduler 244 may schedule UEs for data transmission on the downlink and/or uplink.

A UE may access the wireless network for various services such as voice, video, packet data, messaging, broadcast, and the like. One of the services the wireless network provides to the UE is a voice call service. In an aspect, the wireless network provides the voice call service through its circuit switch (CS) network. In the circuit switch network, a connection between two parties in the call is established and voice packets use the same connection. The circuit switch network may configure the entire bandwidth of the channel in advance to serve the voice call. Although this type of bandwidth configuration may be reliable, it can waste resources and bandwidths for communication. Some new types of wireless networks, such as LTE and NR, may not support CS services. These new wireless networks are optimized to support packet data based services such as services from Internet. To support voice calls and interworking with legacy CS networks, Internet Protocol (IP)-Multimedia Subsystem (IMS) may be used. IMS is a framework for delivering IP multimedia services, so that network providers can provide multimedia services over an IP packet-switched network. The multimedia services provided by IMS include a voice-over-IP (VoIP) service, which can provide a UE with a better quality voice call service compared to the CS voice call service.

Figure 3:
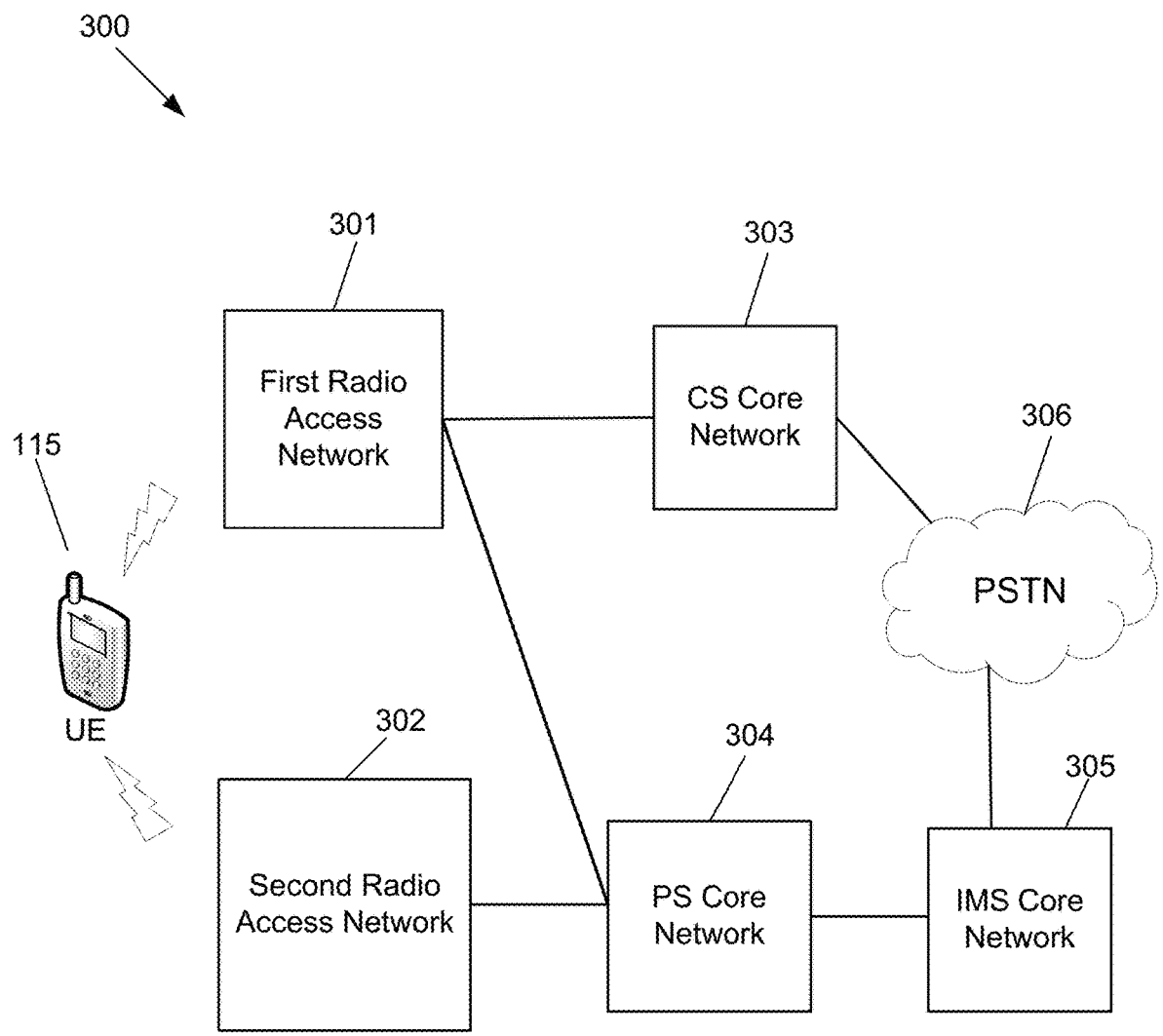
FIG. 3 is a block diagram illustrating a wireless communication system configured to provide voice call services including emergency call services according to one aspect of the present disclosure.

FIG. 3 illustrates a wireless system of a network provider configured to provide voice call services including emergency call services, in accordance with various aspects of the present disclosure. In an aspect of the present disclosure, a first radio access network 301 may be connected to a CS core network 303 and/or a PS core network 304. A second radio access network 302 may be connected to the PS core network 304. The CS core network 303 may be connected to a public switched telephone network (PSTN) 306. The PS core network 304 may be connected to the PSTN 306 via an IMS core network 305

In an aspect, the first radio access network 301 may be CDMA, GSM, WCDMA or TDS-CDMA networks that may support both CS and PS services. The second radio access network 302 may be LTE or NR networks that may support PS services. The UE 115 may be connected to the radio access network 301 that supports both CS and PS services and/or to the radio access network 302 that supports only PS services. The first radio access network 301 is connected to the CS core network 303 and to the PS core network 304. The second radio access network 302 is connected to the PS core network 304.

In various aspects, the UE 115 may make a voice call when the UE 115 camps on (e.g., the UE 115 registers with the network and is able to receive services through a radio access network) the first radio network 301 using the CS voice service. The voice call by the UE 115 may be routed through the CS core network 303 to the PSTN. When the UE camps on the second radio network 302 and makes a phone call, the call may be routed through the PS core network 304 to the IMS core network 305 using packet data network. The IMS core network 305 may deliver the IP multimedia services including the VoIP service. To interact with legacy phones that only support CS voice calls, the IMS core network 305 is connected to the PSTN 306 and may convert the VoIP calls into CS voice calls and vice and versa.

In another aspect of the present disclosure, the network provider may not support VoIP service with its PS only radio technology. Instead, the voice call service, when the UE camps on the second radio access network 302, may be provided through a circuit-switch fallback (CS fallback) or a VoIP fallback. With the CS fallback, the second radio access network 302 makes the UE fallback from the second radio access network 302 to the first radio access network 301, when the UE makes a voice call to or receives a voice call from another user. With the VoIP fallback, the second radio access network 302 makes the UE fallback to another radio access technology (RAT) capable of a VoIP call, when the second radio access network 302 does not support a VoIP call.

The network provider may also provide an emergency call service. The UE may make the emergency call when the user of the UE in emergent situation dials a number for the emergency call such as 911. The network handles the emergency calls with higher priority than normal voice calls, so that the user can connect with an agency to help the emergency situation. The network provider may have special handling of the emergency call, such as providing the location of the user to the agency using location-based services (LBSs). The UE 115 camping on the first radio access network 301 may make an emergency call using the CS voice service. The UE 115 camping on the second radio access network 302 may make an emergency call using the VoIP service or the CS fallback service, such as depending on the services the network provider enabled with its network.

In an aspect of the present disclosure, the UE 115 may need to have a service subscription from the network provider in order to be able to access the wireless network. Various RATs including UMTS, LTE and NR, use a User Services Identity Module (USIM) for the provision of the service subscription. The USIM may be physically implemented with a physical Universal Integrated Circuit Card (UICC). The UICC card may be called as a SIM card. Additionally or alternatively, the USIM may be implemented as part of software in the UE, called a software SIM or an electronic SIM (eSIM).

In various aspects of the present disclosure, the UE 115 may support multiple service subscriptions. To support multiple service subscriptions, the UE 115 may have multiple USIMs. The USIMs may be implemented with SIM cards, where each SIM card has information for each service subscription. In another aspect, the USIMs may be implemented in software, such as eSIMs. In one aspect, each of the multiple subscriptions may be associated with different network providers. Additionally or alternatively, multiple subscriptions may be provided by the same network providers. The UE 115 with multiple service subscriptions may be capable of camping on or connecting with different radio access networks simultaneously, so that the UE 115 can receive services provided by the multiple service subscriptions. In an aspect, the UE 115 may include multiple receiver and transmitter hardware components (e.g., transceiver chains) to support contemporaneous communications with the multiple radio access networks.

Figure 4:
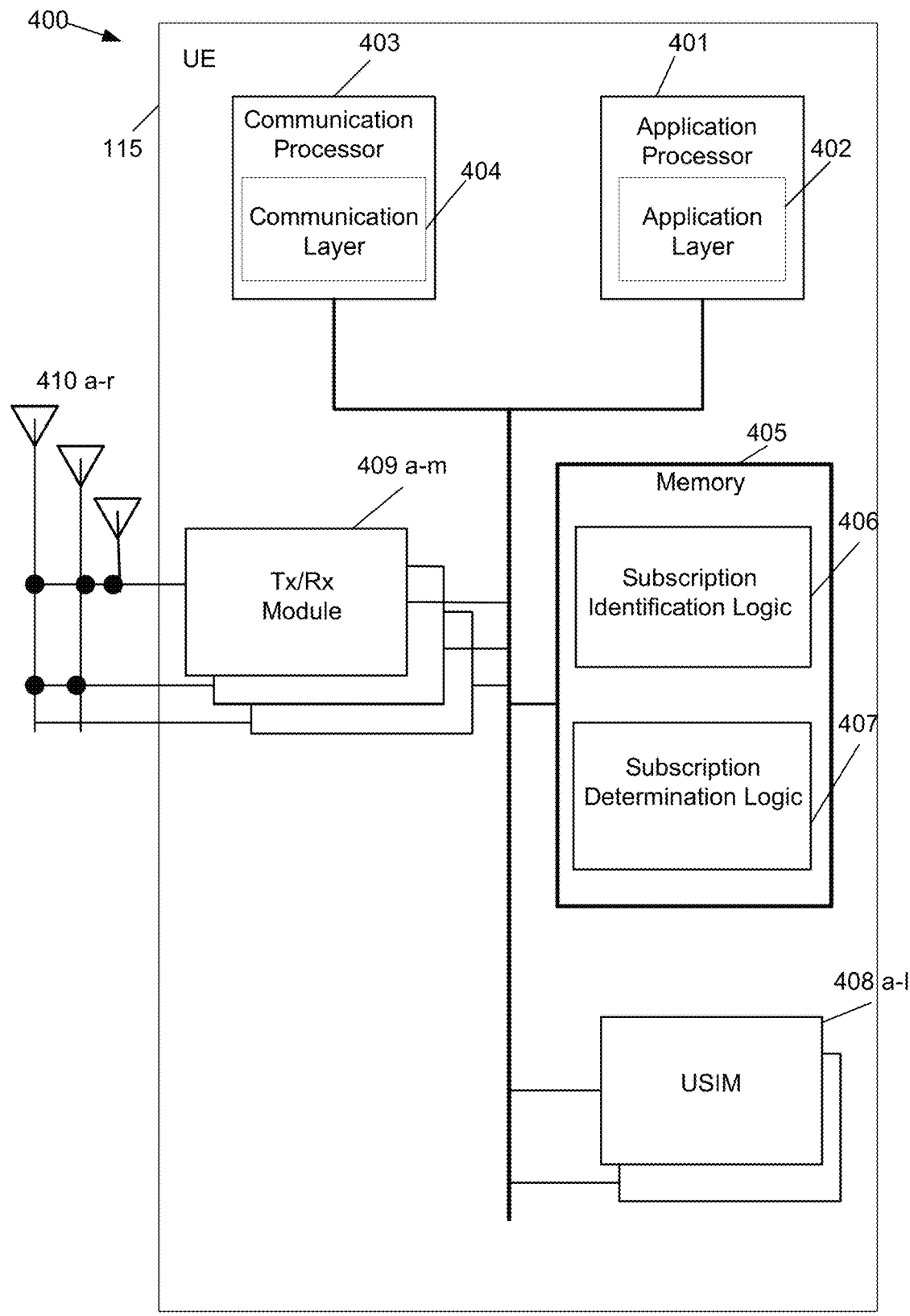
FIG. 4 is a block diagram illustrating an example of a UE configured to support multiple subscriptions according to one aspect of the present disclosure.

FIG. 4 depicts a UE configured to support multiple service subscription, in accordance with various aspects of the present disclosure. The UE 400 in FIG. 4 includes structure, hardware, and/or components as illustrated for the UE 115 of FIG. 2. For example, the UE 400 includes application processor 401, which operates to execute logic or computer instructions stored in memory 405, as well as controlling the components of UE 400 that provide various features and functionality of the UE 400. The application processor 401 and the communication processor 403 may include the Controller/Processor 280 illustrated in FIG. 2. The UE 400 may include communication processor 403, which operates to execute logic or computer instructions stored in memory 405 related to communication. The UE, under control of the communication processor 403, may transmit and receive signals via transmit/receive (TX/RX) modules 409*a-m* and antennas 410*a-r*. The antennas 410*a-r* may correspond to the antennas 252*a-r* illustrated in FIG. 2. The TX/RX modules 409*a-m* may include various components and hardware, such as modulator/demodulators 254*a-r*, MIMO detector 256, and/or TX MIMO processor 266 as illustrated in FIG. 2. Memory 405 of the UE 400 shown in FIG. 4 stores logic and data for identification of one or more subscriptions according to aspects of the present disclosure and may include the memory 282 illustrated in FIG. 2. The UE 400 may include multiple USIMs 408*a-1* to support multiple service subscriptions.

In an aspect of FIG. 4, the application processor 401 and the communication processor 403 are connected to memory 405 that stores code that is configured to execute various tasks including subscription identification logic 406 and subscription determination logic 407. The communication layer 404 of the communication processor 403 may receive, from the application layer 402 of the application processor 401, an emergency call subscription selection request. The communication processor 403 may identify, in response to the emergency call subscription selection request, a first service subscription from the multiple service subscriptions based on information associated with the multiple service subscriptions. According to some aspects, the information may include a first portion that is available to a layer below the application layer (e.g., the communication layer) and is unavailable at the application layer, and a second portion that is available at the application layer. The communication processor 403 may provide, to the application processor 401, a first indication of the first service subscription.

The application processor 401 may transmit to the communication processor 403 an emergency call subscription selection request. The application processor 401 may receive, in response to the emergency call subscription selection request, a first indication of a first service subscription from the communication processor 403. The first indication of a first service subscription may be based on information associated with the multiple service subscriptions, wherein the information may include a first portion that is available to the layer below the application layer (e.g., the communication layer) and is unavailable at the application layer, and a second portion that is available at the application layer. The application processor 401 may determine, in response to receiving the first indication of the first service subscription, a service subscription of the multiple service subscriptions for an emergency call.

The application processor 401 of UE 400 shown in FIG. 4 may execute logic performing operations defining various functional layers, including an application layer 402. The application layer 402 of some examples runs a high level operating system (HLOS) such as Android or iOS and application programs. The communication processor 403 may execute logic performing operations of a communication layer 404, such as may include physical layer and MAC layer operations for wireless communication. In an aspect, a chipset implementing the function of the communication processor 403 is called as a modem. The communication layer 404 may control the wireless communication and interface with the transmission and reception module 409*a-m*.

It should be appreciated that, although the exemplary aspect of FIG. 4 is illustrated with the application processor 401 and the communication processor 403, the application processor 401 and the communication processor 403 may be implemented in various configurations, including single, multicore, and multiple processor implementations. For example, the application processor 401 and the communication processor 403 may be provided in a plurality of separate chipsets. In such an aspect, an external interface connects the chipsets implementing the application processor 401 and the communication processor 403, called a modem chipset and the application layer 402 and the communication layer 404 relies on the external interface to interact with each other. In another aspect, a single chipset may implement both the application processor 401 and the communication processor 403, wherein the interface between two layers is internal to the chipset.

The UE 400 in FIG. 4 has multiple USIMs 408*a-l*. Each of the USIMs 408*a-1* has information for accessing services from a network provider, such as may include the network provider's name, associated telephone number, security credentials and the like. The USIMs 408*a-1* may include physical SIM card such as UICC, and/or software such as eSIM. As shown in the FIG. 4, the UE 115 may have multiple Tx/Rx modules 409*a-m* connected with antennas 410*a-n*, which allows the UE 115 to communicate with multiple radio access networks with which the UE 115 has the service subscriptions.

When the UE having multiple service subscriptions needs to make an emergency call, the UE may identify and select a subscription to make the emergency call, so that the emergency call can be successfully made. When a user of the UE 115 makes an emergency call, a voice calling application in the application layer may be used. With the multiple service subscriptions available at the UE 115, the UE may determine which service subscription to use to make the emergency call. In an aspect, the application layer 402 may not have enough information, or perhaps some relevant information, to determine the service subscription of the multiple service subscriptions better suited (e.g., a subscription having a better chance of making an emergency call, having less chance of losing the connection during the call, or having better voice call quality) for the emergency call.

One or more protocol layers operable below the application layer may have information useful in determining the service subscription of the multiple subscriptions better suited for the emergency call. For example, the communication layer 404 comprises a layer below the application layer that may have information relevant to a determination of the service subscription better suited for the emergency call. In an aspect, at least some information available to the communication layer 404 may not be available to the application layer 402. As such, the application layer 402 may interact with the communication layer 404 and/or other layers below the application layer before making the emergency call.

In an aspect, the application layer may make an emergency call subscription selection request to the communication layer for information to identify a service subscription from the multiple service subscriptions based on information associated with the multiple service subscriptions. First information may be available to a protocol layer below the application layer (e.g. the communication layer 404) and unavailable at the application layer. Second information may be available to the application layer 402. In an aspect, the application layer 402 may initiate an emergency call request using a service subscription identified in response to the emergency call subscription selection request. In another aspect, the application protocol layer 402 may initiate an emergency call request using a service subscription other than the service subscription identified in response to the emergency call subscription selection request.

Figure 5:
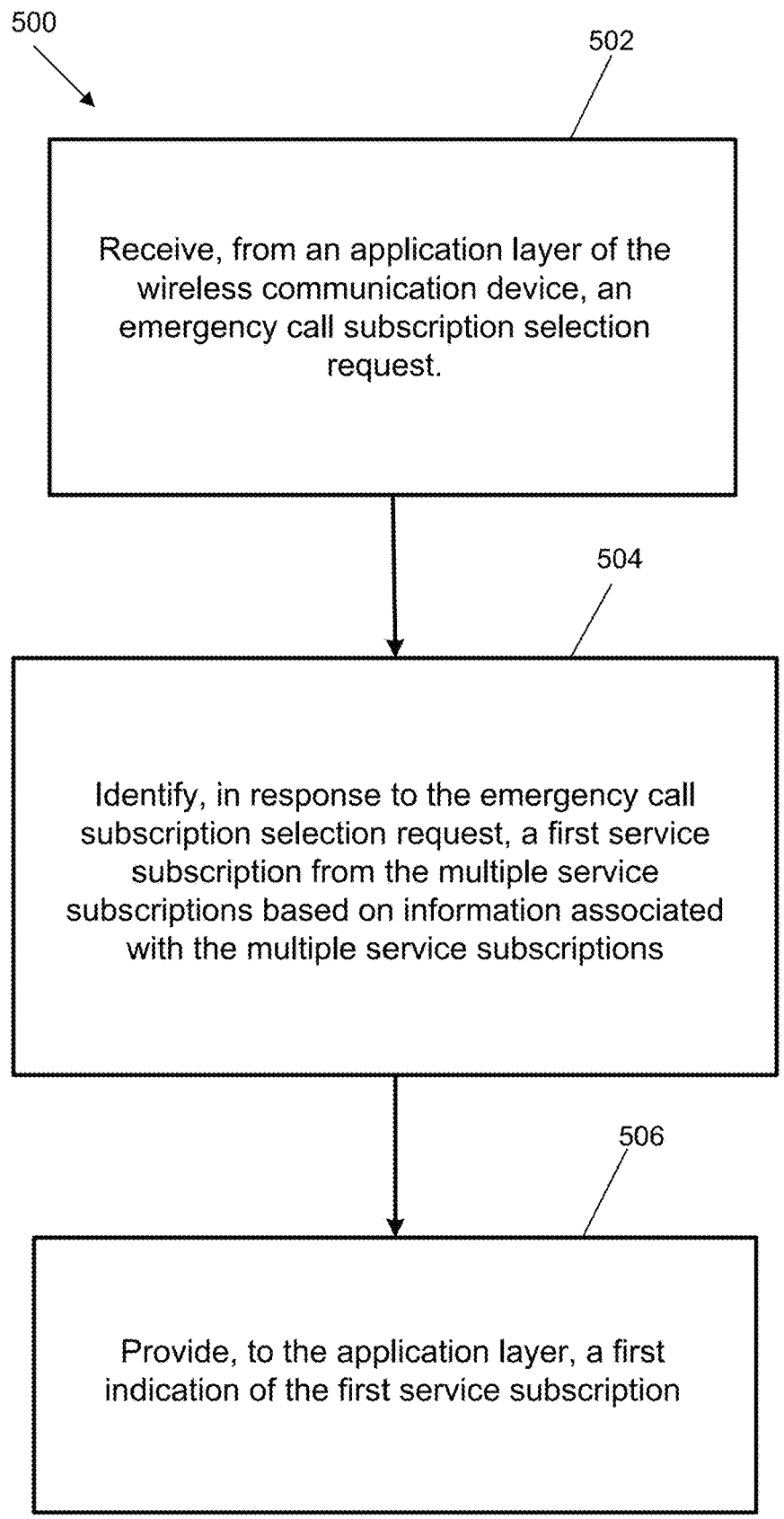
FIG. 5 is a block diagram illustrating example blocks executed to provide subscription identification according to one aspect of the present disclosure.

FIG. 5 is a block diagram showing an example of operation to identify subscription according to various aspects of the present disclosure. The flow 500 shown in FIG. 5 may, for example, be executed in a layer below the application layer, such as in the communication layer 404, to identify a service subscription from the multiple service subscriptions better suited for an emergency call based on information associated with the multiple service subscriptions. The first information may be available to a layer below the application layer (e.g. communication layer 404) and unavailable at the application layer. The second information may be available at the application layer. The subscription identification logic 406 of FIG. 4 may, for example, provide the functions of the flow 500 when executed by communication processor 403.

At block 502 of the illustrated example, the subscription identification logic executed by a layer below the application layer (e.g., communication layer 404) receives an emergency call subscription selection request from the application layer (e.g., application layer 402). For example, the application layer of UE 400 may initiate an emergency call. In an aspect, prior to making the emergency call, the application layer may operate to determine a service subscription of the multiple service subscriptions to designate for the emergency call. The application layer may not, however, have sufficient information, or perhaps some relevant information, to determine the service subscription of the multiple service subscriptions better suited for the emergency call. Accordingly, as part of the application layer's operation to determine a service subscription for the emergency call, the application layer may provide an emergency call subscription selection request to the communication layer for information identifying a service subscription from the multiple service subscriptions based on information associated with the multiple service subscriptions that is not available to the application layer. The emergency call subscription selection request may, for example, include an inter-chipset message through AP-modem interface in an embodiment with multiple chipsets for the application processor 401 and the communication processor 403. In another example, the emergency call subscription selection request may include a signaling by the application layer to a modem interface layer of the communication layer in an embodiment of a single chipset for the application processor 401 and the communication processor 403.

At block 504, in response to the emergency call subscription selection request, the communication layer identifies a first subscription from the multiple service subscriptions based at least in part on information associated with the multiple service subscriptions. In an aspect, some information (e.g., the second information) associated with the multiple service subscriptions may be available to both of the application layer and the communication layer. In another aspect, other information (e.g., the first information) associated with the multiple service subscriptions may be available only to the communication layer, or otherwise not available to the application layer. For example, when the UE enters a temporary no-service status, the communication layer may maintain a buffered status for a fixed time period before the communication layer finally reports the no-service status to the application layer. Such a buffered status reflects the up-to-date service status of the service subscription and may be only available to the communication layer. For example, the communication layer may continue to report in-service status to the application layer, although the logic of the communication layer knows the true no-service status of the service. The continued reporting of in-service status despite the communication layer knowing the true no-service status of the service may be provided for various reasons, such as to avoid the application layer oscillating between in-service and no-service and/or to prevent unnecessary processing to change services when service is temporarily lost, particularly if no other or no better service is available In an aspect, the first information that may be available to the communication layer, but not the application layer, may include emergency access barring probability of two subscriptions, various rejection causes the UE received from the networks, up-to-date signal strength and service quality and other access stratum information (e.g., no-service status of a service), and the like. The first information may include some or all such information that may be available only to the communication layer or which is otherwise not available to the application layer.

The information of the multiple service subscriptions that the communication layer may use to select the subscription for the emergency call may include the second information available to the application layer and the communication layer and/or the first information available to the communication layer and not available to the application layer. The information of the multiple service subscriptions may, for example, include emergency call support information, service status information, roaming information, and/or radio condition information.

In an aspect, the emergency call support information may include information about whether a current radio access network of a subscription supports an emergency call. The radio access network may support the emergency call in various ways. It may support the emergency call natively either through a CS voice call or a VoIP over a PS network, when an emergency call can be made through the current radio access network without fallback to another radio access network. Additionally or alternatively, the radio access network may support the emergency call through fallback (e.g. emergency fallback to a CS network or a radio access network supporting a VoIP call). Alternatively, the radio access network may not support an emergency call. In another aspect, the subscription identification logic may select a first service subscription with the native emergency call support over a second subscription with the fallback to another network. Additionally or alternatively, subscription identification logic may select a first service subscription with the emergency fallback over a second subscription with no emergency call support. When both service subscriptions support emergency calls natively, the subscription identification logic may select a first service subscription with VoIP over a PS network than a second subscription with a CS voice call.

In an aspect, the service status information may indicate a service status the service subscription is in. For example, the service status information may include full service status, limited service status, and/or no service status. In an aspect, the subscription identification logic may select a first service subscription with the full service status over a second service subscription with the limited service status. Additionally or alternatively, the subscription identification logic may select a first service subscription with the limited service status over a second service subscription with the no service status.

In another aspect, the roaming information may indicate if the current serving network of a service subscription is a home network that the subscription is associated with or a roaming network that is different from the home network. The subscription identification logic may select a first service subscription served by the home network over a second service subscription served by the roaming network.

In other aspects of the present disclosure, the radio condition information may include signaling strength, service quality, emergency access barring probability of one or more subscriptions, various rejection causes the UE has received from the networks, access stratum information and/or the like. For example, a first part of the radio condition information may be available to the communication layer and not available to the application layer. The subscription identification logic may, when selecting a service subscription from the multiple service subscriptions, prioritize a service subscription having a lower probability of barring, a lower severity of network rejection type, a stronger signal strength, a better service quality, and/or a higher probability for emergency call to succeed. The subscription identification logic may prioritize the subscription that supports location service.

In various aspects, the subscription identification logic may, at block 504 of the flow 500, use some or all of the various information discussed herein to determine the service subscription used for the emergency call. Hierarchical identification of a service subscription to be used for an emergency call may be based on identifying steps using different hierarchical levels of the information, as discussed in more detail in view of FIG. 6 and FIG. 7 below. In the hierarchical identification, an identifying step based on a second part of the information may take place if an identifying step based on a first part of the information fails to select one subscription for the first service subscription. In one aspect, the subscription identification logic may identify a service subscription for the emergency call based the different prioritization associated with different levels of the hierarchical structure of the information. For example, the radio condition information may have the lowest priority level and may be used as the last determining factor, when it fails to identify a service subscription based on other levels of the hierarchical structure of the information.

Referring still to FIG. 5, at block 506 of the flow 500, the subscription identification logic provides an indication of the first service subscription to the application layer. For example, a service subscription from the multiple service subscriptions identified by the subscription identification logic may be better suited for the emergency call based on the information associated with the multiple service subscriptions. The communication layer may provide an indication of the first service subscription to the application layer. The indication of the first service subscription provided in response to the emergency call subscription selection request may, for example, comprise an inter-chipset message through AP-modem interface in an embodiment with multiple chipsets for the application processor 401 and the communication processor 403, or a signaling from the modem interface layer of the communication layer to the application layer in another embodiment of a single chipset for the application processor 401 and the communication processor 403. If the subscription identification logic fails to identify a first service subscription having higher priority or preference over a second service subscription, the subscription identification logic may provide an indication of multiple service subscriptions having equal priority to the application layer.

Figure 6:
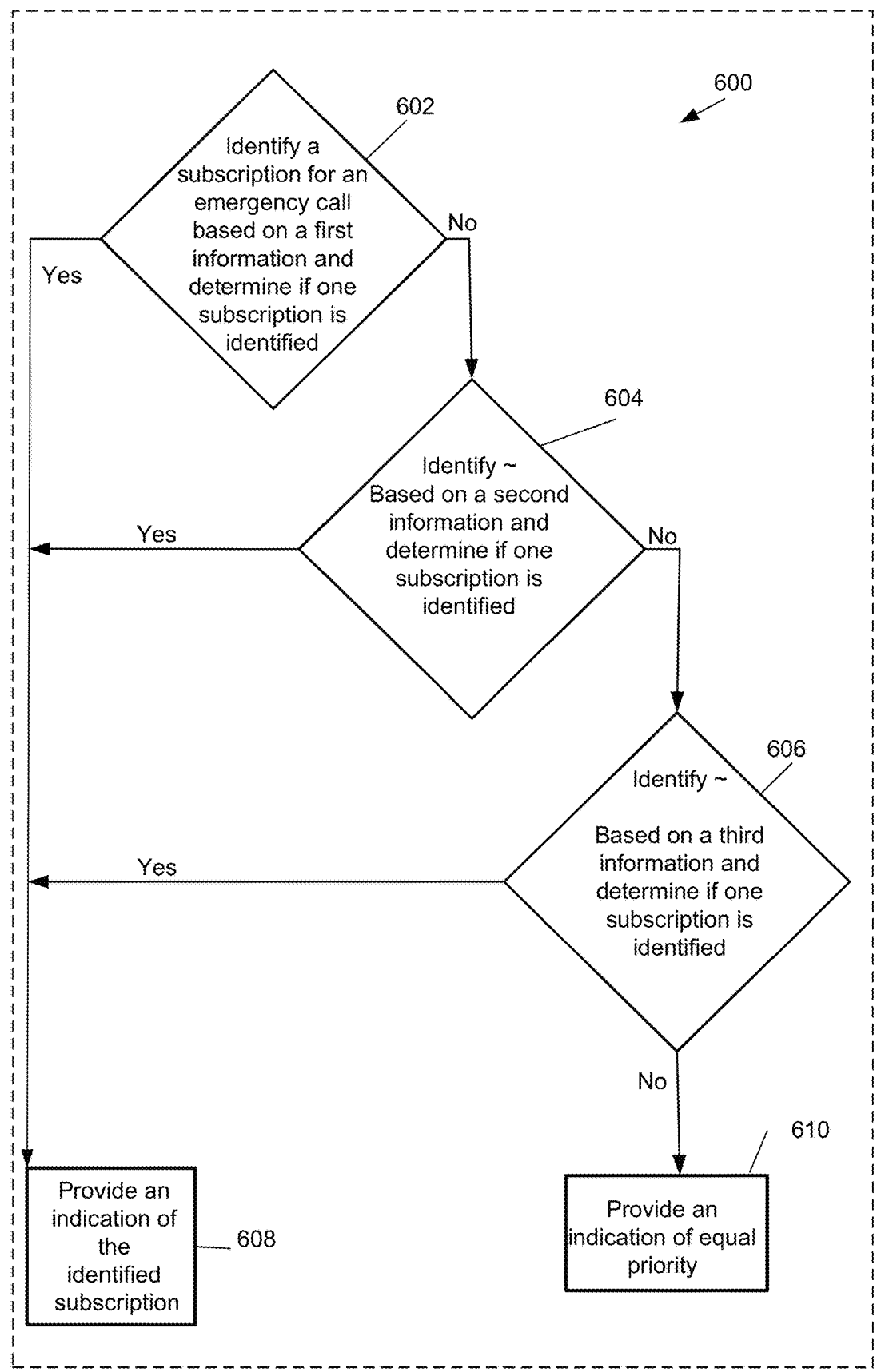
FIG. 6 is a block diagram illustrating example blocks executed to identify a subscription to make an emergency call according to one aspect of the present disclosure.

FIG. 6 is a block diagram that illustrates an example of the hierarchical identification operation that may be implemented by the subscription identification logic in accordance with various aspects of the present disclosure. At block 602 of the flow 600 shown in FIG. 6, the subscription identification logic attempts to identify a service subscription for the emergency call based on a first part of the information associated with the multiple service subscriptions. For example, the subscription identification logic may attempt to identify a first service subscription for an emergency call based on the emergency call support information for the multiple service subscriptions first before using other information for the multiple service subscriptions. If a service subscription of the multiple service subscriptions (e.g., a service subscription better suited for the emergency call) is successfully identified based on the first part of the information, then the subscription identification logic of the illustrated example executes block 608. At block 608, the communication layer provides an indication of the identified subscription to the application layer. If, however, a service subscription of the multiple service subscriptions is not successfully identified based on the first part of the information associated with the multiple service subscriptions, then the subscription identification logic of the example executes block 604. At block 604, the communication layer uses a second part of the information associated with the multiple service subscriptions to identify a service subscription for the emergency call. For example, the second part of the information may be roaming information for the multiple service subscriptions. In operation of the hierarchical identification of the example, similar steps repeat at block 606 for lower level determinations in the hierarchy. For example, at block 606, the subscription identification logic may attempt to identify the first service subscription based on service status information for the multiple service subscriptions. If the communication layer fails to identify a service subscription after traversing the hierarchical determinations of the hierarchical identification, the subscription identification logic of the example executes block 610. At block 610, the communication layer may provide an indication of multiple service subscriptions (e.g., service subscriptions having equal priority) to the application layer. In an aspect, the indication of multiple service subscriptions may comprise providing information identifying the multiple subscriptions to the application layer. When the communication layer provides the indication of multiple service subscriptions to the application layer, the application layer may select a subscription to make an emergency call based on its own logic.

Figure 7:
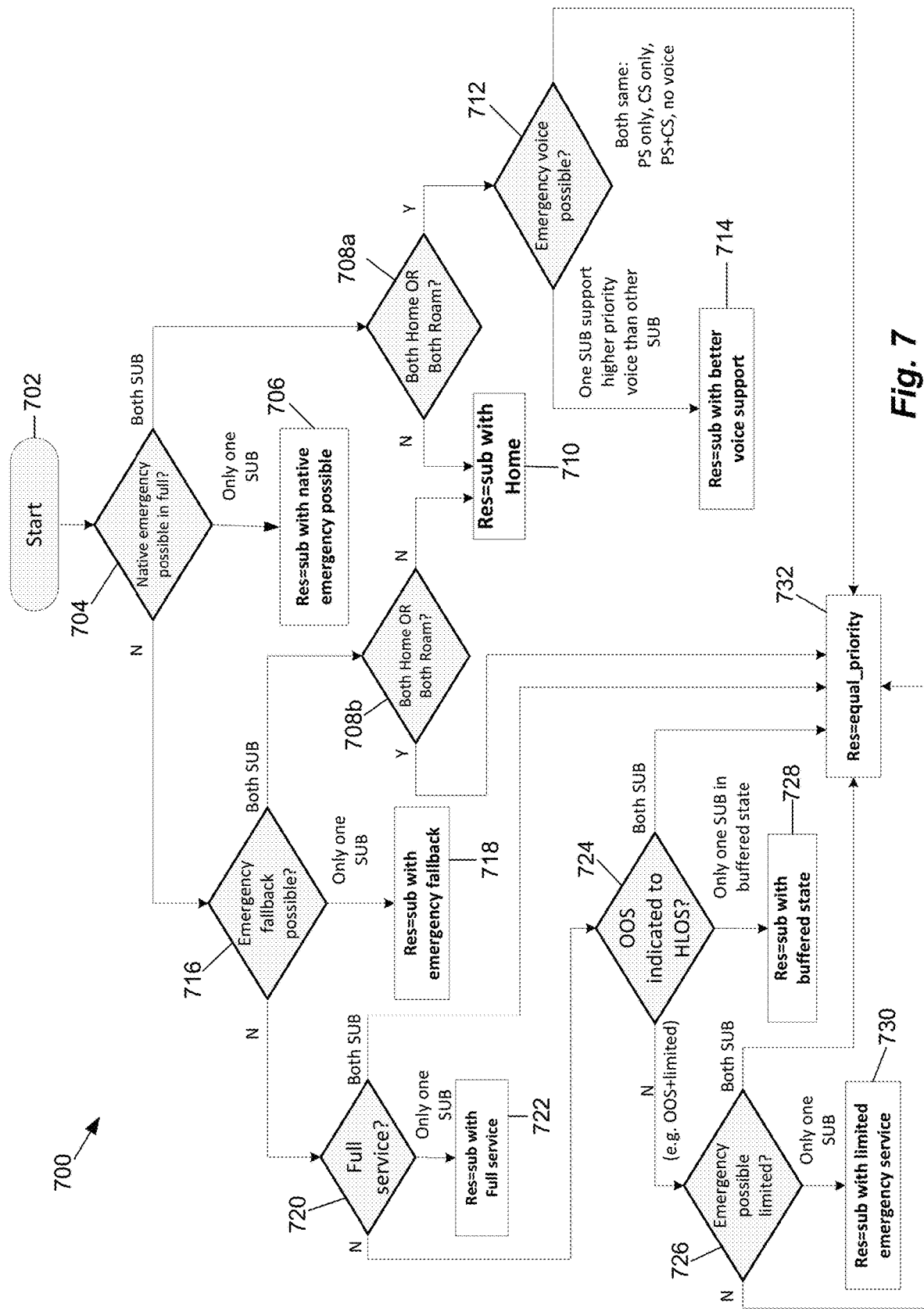
FIG. 7 is a block diagram illustrating example blocks executed to identify a subscription to make an emergency call according to one aspect of the present disclosure.

FIG. 7 is another block diagram that illustrates an example of the hierarchical identification operation as may be implemented by subscription identification logic of embodiments, such as at block 504 of FIG. 5, by a UE with multiple service subscriptions. The subscription identification logic as illustrated FIG. 5 uses various information of service subscriptions such as emergency call support information, roaming information, and service status information.

The identification based on the emergency call support information of multiple service subscriptions according to the flow 700 of the example of FIG. 7 may include identification based on native emergency call support (e.g. block 704), emergency fall back support (e.g. block 716), and/or other various information regarding emergency call support (e.g. block 712). Starting the identification procedure from block 702, at block 704 of the illustrated example of hierarchical identification operation, the hierarchical identification operation checks if native emergency call is possible with each of the multiple service subscriptions. If only one service subscription supports native emergency call, then at block 706, the service subscription supporting native emergency call is selected in the example. At block 704, if none of the service subscriptions support emergency call natively the illustrated hierarchical identification operation executes block 716. At block 716, the hierarchical identification operation of the example checks if emergency fallback is possible with each service subscription. If each service subscription supports the emergency fallback at block 716 or each service subscription supports native emergency call, at block 704, the hierarchical identification operation may proceed with identification based on information of next hierarchy, e.g. the roaming information at blocks 708a and 708b respectively.

At block 708a, the hierarchical identification operation may identify a first service subscription based on roaming information. The hierarchical identification operation of the example checks if the service subscriptions are with a home network or with a roaming network. If the hierarchical identification operation determines that only one of the service subscriptions is served by the home network, the hierarchical identification operation may select the service subscription from home network at block 710. If each subscription is served by the home network or the roaming network, the hierarchical identification operation of the example proceeds with the next steps, such as block 712. At 708b, the hierarchical identification operation also checks if the service subscriptions are with home network or with roaming network. If the hierarchical identification operation determines that only one of the service subscriptions is served by the home network, the hierarchical identification operation may select the service subscription from home network at block 710. If each subscription is served by the home network or the roaming network, the service subscriptions are selected with the equal priority at block 732 of the illustrated example.

At Block 712, the hierarchical identification operation may identify a service subscription based on emergency call support information. At block 712, the hierarchical identification operation checks various information regarding emergency call support. At block 714, the hierarchical identification operation selects a service subscription with better (e.g., PS voice over CS voice, such as because PS voice provides better voice quality then CS voice) emergency call support. Otherwise, at block 716, the service subscriptions are selected with the equal priority in the example.

The identification based on service status information may include identifications based on full service status of the service subscription (e.g. block 720), indication of out-of-service status to high-level operating system (HLOS) in the application layer (e.g. block 722), and/or limited service status information (e.g. block 726). If none of the service subscriptions support the emergency fallback at block 716, at block 720, the hierarchical identification operation of the example checks if the service status of the service subscriptions is full service. If each service subscription is in full service status, the service subscriptions are selected with the equal priority at block 732 in the illustrated example. If only one service subscription is in full service status, that service subscription is selected at block 722. Otherwise, at block 724, the hierarchical identification operation checks if out of service status has been indicated to the application layer. If one service subscription is in buffered status and the out of service status is not yet indicated, that service subscription is selected at block 728 of the example. Otherwise, at block 726, the hierarchical identification operation checks if one of the service subscriptions is in the limited service status that allows an emergency call and, if so, that service subscription is selected at block 730 of the illustrated example.

Figure 8:
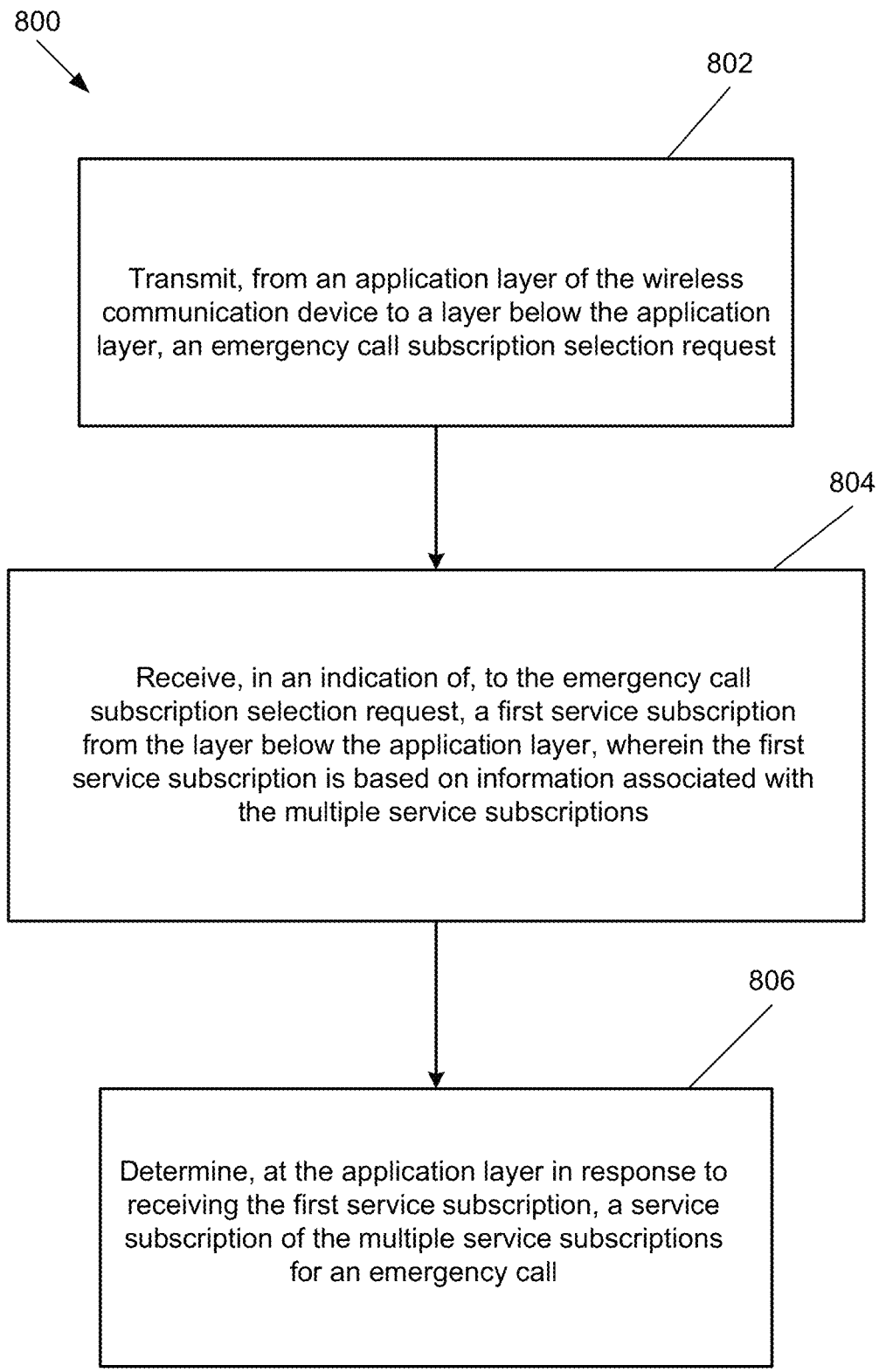
FIG. 8 is a block diagram illustrating example blocks executed to provide emergency call subscription determination according to one aspect of the present disclosure.

FIG. 8 a block diagram illustrating example blocks executed to provide emergency call subscription determination according to various aspects of the present disclosure. The functions of the flow 800 shown in FIG. 8 may, for example, be executed in an application layer to determine a service subscription from the multiple service subscriptions to be designated for use with respect to an emergency call. Embodiments of emergency call subscription determination logic 407 of FIG. 4 may, for example, provide the functions of the flow 800 when executed by the application processor 401.

At block 802 of the illustrated example, the application layer (e.g., application layer 402) transmits to a layer below the application layer, such as the communication layer (e.g., communication layer 404), an emergency call subscription selection request. For example, a user of UE 400 may have initiated an emergency call using the application layer (e.g., a voice calling application executed by UE 400) and, prior to making the emergency call with a wireless network, the emergency call subscription determination logic may operate to determine a service subscription of the multiple service subscriptions to designate for the emergency call when making the emergency call. As discussed above, the application layer may not have information to determine the service subscription of the multiple service subscriptions better suited for the emergency call. Accordingly, as part of the emergency call subscription determination logic operation to determine a service subscription for the emergency call, an emergency call subscription selection request is made to the communication layer for information identifying a service subscription from the multiple service subscriptions based on information associated with the multiple service subscriptions that is not available to the application layer. The emergency call subscription selection request may, for example, include an inter-chipset message through AP-modem interface in an embodiment with multiple chipsets for the application processor 401 and the communication processor 403, or a signaling by the application layer to a modem interface layer of the communication layer in another embodiment of a single chipset for the application processor 401 and the communication processor 403.

At block 804, in response to the emergency call subscription selection request, the application layer receives an indication of a service subscription from the communication layer. In operation according to embodiments of the present disclosure, subscription identification logic (e.g., subscription identification logic 405, such as may be executed in communication layer 404) may provide an indication of a service subscription to the application layer. For example, a service subscription from the multiple service subscriptions identified by the subscription identification logic as better suited for the emergency call based on information associated with the multiple service subscriptions may be reported from the communication layer to the application layer. The indication of the first service subscription as provided in response to the emergency call subscription selection request may comprise an inter-chipset message through AP-modem interface in an embodiment with multiple chipsets for the application processor 401 and the communication processor 403, or a signaling from the modem interface layer of the communication layer to the application layer in another embodiment of a single chipset for the application processor 401 and the communication processor 403. If the communication layer fails to identify one service subscription, the emergency call subscription determination logic may receive an indication of multiple service subscriptions (e.g., service subscriptions having equal priority) from the communication layer.

At block 806 of the example, in response to receiving the first service subscription, the emergency call subscription determination logic operates to determine a service subscription for an emergency call. If the application layer received multiple subscriptions, it may determine the service subscriptions from those it received from the communication layer based on its own logic. The logic may, for example, be based on a user preference configured in the application layer, configuration about default voice subscription, and the like. The application layer of some examples may determine a different subscription than what it received from the communication layer, based on other inputs such as a user preference configured in the application layer, configuration about default voice subscription and the like.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5, FIG. 6, FIG. 7 and FIG. 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication for a wireless communication device having multiple Services Identity Modules (SIMs) for supporting multiple service subscriptions, comprising:
   transmitting, from an application layer running an operating system of the wireless communication device to a communication layer below the application layer, an emergency call subscription selection request, wherein the communication layer is separate from the application layer;
   receiving, at the application layer in response to the emergency call subscription selection request, a first indication of a first service subscription from the communication layer,
   wherein the first indication of the first service subscription is based on information associated with the multiple service subscriptions,
   wherein the information includes a first portion that is available to the communication layer and is unavailable at the application layer, and a second portion that is available at the application layer; and
   determining, at the application layer in response to receiving the first indication of the first service subscription, a service subscription of the multiple service subscriptions for an emergency call.

2. The method of claim 1, further comprising:
   receiving, in response to the emergency call subscription selection request, a second indication of a second service subscription from the communication layer.

3. The method of claim 2, wherein the first indication of the first service subscription and the second indication of the second service subscription are a single indication of equal priority.

4. The method of claim 1, wherein the service subscription for the emergency call is different from the first service subscription.

5. The method of claim 1, wherein the first portion of the information is available only at the communication layer, wherein the communication layer includes a modem of the wireless communication device, and wherein the application layer includes a voice calling application.

6. The method of claim 1, wherein the information includes emergency call support information for the multiple service subscriptions, service status information for the multiple service subscriptions, roaming information for the multiple service subscriptions, and radio condition information for the multiple service subscriptions, and wherein the first portion of the information comprises part of service status information and part of radio condition information.

7. The method of claim 6, wherein the service status information is a buffered service status information that is available to the communication layer and is unavailable at the application layer.

8. The method of claim 1, wherein the determined service subscription of the multiple service subscriptions is different from the first service subscription from the first indication.

9. The method of claim 1, wherein the first indication identifies two or more service subscriptions, and the determined service subscription is selected from the two or more service subscriptions.

10. An apparatus having multiple Services Identity Modules (SIMs) for supporting multiple service subscriptions configured for wireless communication, comprising:
    at least one processor; and
    a memory coupled to the at least one processor, wherein the at least one processor is configured:
    to transmit, from an application layer running an operating system of the apparatus to a communication layer below the application layer, an emergency call subscription selection request,
    wherein the communication layer is separate from the application layer;
    to receive, at the application layer in response to the emergency call subscription selection request, a first indication of a first service subscription from the communication layer,
    wherein the first indication of the first service subscription is based on information associated with the multiple service subscriptions,
    wherein the information includes a first portion that is available to the communication layer and is unavailable at the application layer, and
    a second portion that is available at the application layer; and
    to determine, at the application layer in response to receiving the first indication of the first service subscription, a service subscription of the multiple service subscriptions for an emergency call.

11. The apparatus of claim 10, wherein the at least one processor is further configured to receive, in response to the emergency call subscription selection request, a second indication of a second service subscription from the communication layer.

12. The apparatus of claim 11, wherein the first indication of the first service subscription and the second indication of the second service subscription are a single indication of equal priority.

13. The apparatus of claim 10, wherein the service subscription for the emergency call is different from the first service subscription.

14. The apparatus of claim 10, wherein the first portion of the information is available only at the communication layer, wherein the communication layer includes a modem of the apparatus, and wherein the application layer includes a voice calling application.

15. The apparatus of claim 10, wherein the information includes emergency call support information for the multiple service subscriptions, service status information for the multiple service subscriptions, roaming information for the multiple service subscriptions, and radio condition information for the multiple service subscriptions, and wherein the first portion of the information comprises part of service status information and part of radio condition information.

16. The apparatus of claim 15, wherein the service status information is a buffered service status information that is available to the communication layer and is unavailable at the application layer.

17. The apparatus of claim 10, wherein the determined service subscription of the multiple service subscriptions is different from the first service subscription from the first indication.

18. The apparatus of claim 10, wherein the first indication identifies two or more service subscriptions, and the determined service subscription is selected from the two or more service subscriptions.

19. The method of claim 5, wherein the modem is implemented by a first processor of the wireless communication device and the application layer is implemented by a second processor of the wireless communication device.

20. The apparatus of claim 14, wherein the at least one processor includes at least one first processor and at least one second processor, and wherein modem is implemented by the at least one first processor and the application layer is implemented by the at least one second processor.

* * * * *